(No Model.)
T. L. WISWALL & J. B. FRANK.
APPARATUS FOR RECOVERY OF PRECIOUS METALS FROM THEIR SOLUTIONS.
No. 549,177. Patented Nov. 5, 1895.
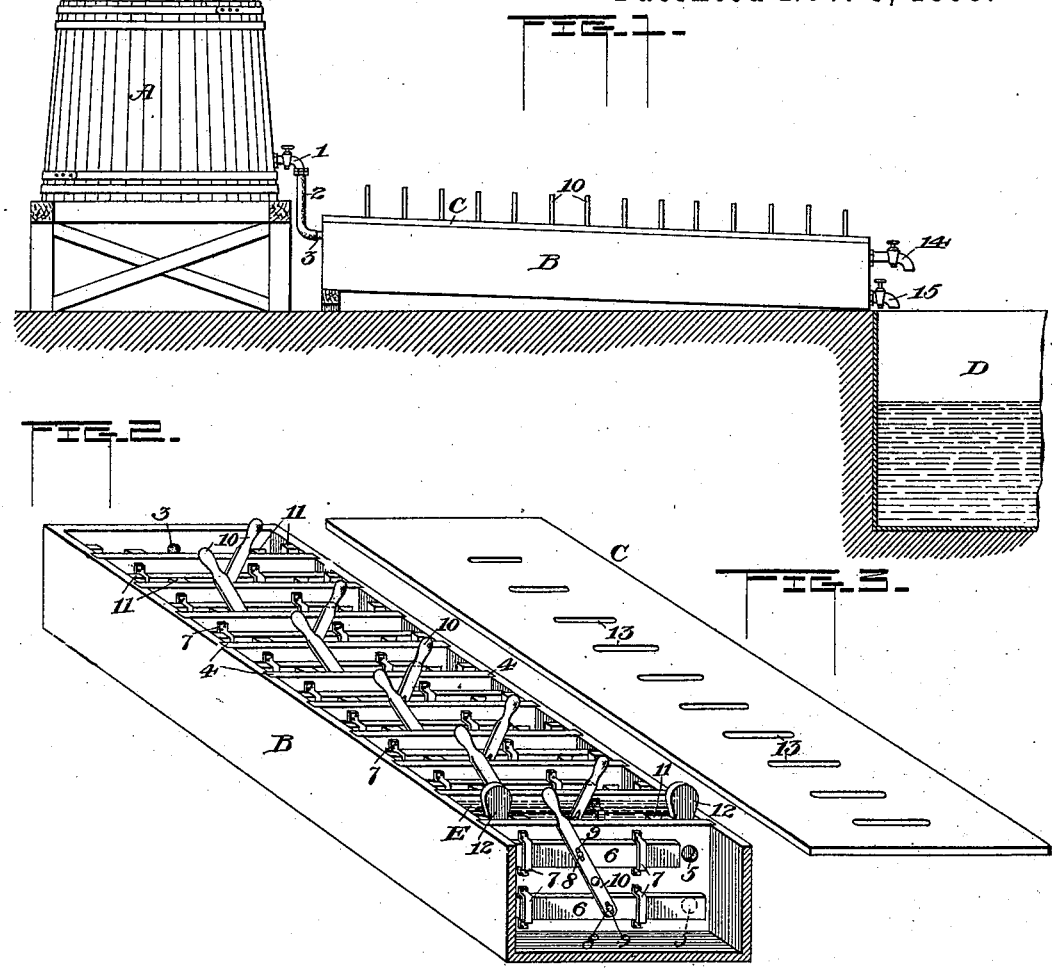
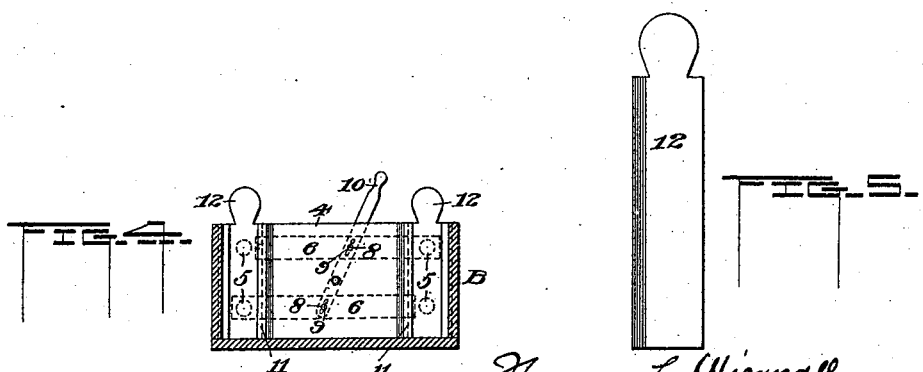
Witnesses
Thomas L. Wiswall
Jerome B. Frank  Inventors.
By
Alfred G. Safford  Attorney

UNITED STATES PATENT OFFICE.

THOMAS L. WISWALL AND JEROME B. FRANK, OF DENVER, COLORADO.

APPARATUS FOR RECOVERY OF PRECIOUS METALS FROM THEIR SOLUTIONS.

SPECIFICATION forming part of Letters Patent No. 549,177, dated November 5, 1895.

Application filed April 1, 1895. Serial No. 544,056. (No model.)

*To all whom it may concern:*

Be it known that we, THOMAS L. WISWALL and JEROME B. FRANK, citizens of the United States of America, residing at Denver, in the county of Arapahoe and State of Colorado, have invented certain new and useful Improvements in Apparatus for the Recovery of Precious Metals from their Solutions, of which the following is a specification, reference being had therein to the accompanying drawings.

This invention relates to improvements in apparatus for the recovery of gold and silver from their solutions whereby the said solutions are caused to percolate through a finely-subdivided metallic precipitating reagent.

Heretofore in the practical operation of filtering precipitating processes of this character much difficulty has been experienced from the compression of the metallic fiber, it compressing in the direction of the flow of the solution. Difficulty has also been experienced from the fact that the chemical action is more active at the points where the solution first comes in contact with said fiber, it becoming first exhausted at that point, while other portions of said fiber within the chamber largely retain their chemical or electrochemical activity. It is therefore desirable in such apparatus to provide means for changing the direction of the flow of the solution in order that harmful compression may be avoided and the entire mass of metallic precipitating reagent be utilized without disturbing the same, and it is also desirable to provide means for opening up the entire interior of the precipitating-box for cleaning up purposes, because not all of the valuable precipitate adheres to the surface of the metallic fiber; but some of it, together with very fine particles of said fiber coated with the precipitate, drops to the bottom of the box, and it is also desirable to provide means, where the precipitating-box is divided into a series of chambers, for stopping the flow of the solution either partially or entirely through any one of the several chambers for the purpose of renewing the contents or otherwise manipulating the contents of any individual chamber.

The present invention provides means for readily changing the direction of the flow of the solution through the different chambers of the precipitating-box, thus changing the point of first contact of the solution with the precipitating reagent in any of the several chambers for stopping the flow at any one of the partitions, the whole apparatus being so arranged that the entire interior of the precipitating-box may be made into one compartment whenever it may be so desired.

Referring to the drawings, wherein the same indicating letters and numerals point out the same parts in each view, Figure 1 is a view partially in cross-section of the whole apparatus. Fig. 2 is a view in perspective of the precipitating-box. Fig. 3 is a view of the cover or lid of said precipitating-box. Fig. 4 is a detailed view of one of the removable partitions of the precipitating-box. Fig. 5 is a plan view of one of the removable gates, shown in position in Fig. 4.

A is the storage-tank containing the solution charged with the precious metals to be treated.

B is the precipitating-box, divided into a series of chambers by removable partitions, one of which is shown in detail in Fig. 4.

C is the lid or cover of the box B.

D is the sump-tank, which receives the spent solution.

E is the finely-subdivided metallic precipitating reagent. In operation all the chambers are filled with this metallic fiber, but for purposes of illustration it is shown in only one of the several chambers.

The storage-tank A is provided with the regulatory stop-cock 1, connected to the flexible tubing 2, which in turn is connected with the nipple 3 of the precipitating-box B. The precipitating-box may be of any convenient shape, preferably rectangular and oblong, and may be divided into as many chambers or individual compartments as may be desired. The end toward the storage-tank A should be elevated more or less as it may be desired to hasten or retard the speed of the flow of the solution.

The precipitating-box is provided with a series of removable partitions 4, by which it is divided into consecutive connected chambers. These chambers ordinarily should be about eight inches wide from partition to partition, although we do not confine ourselves to chambers of any definite measurements. Said partitions are each provided with four perforations 5, one near each corner; also with the adjustable gates 6, held in place by the guides 7, and intended to open or close the perforations 5. Said gates are provided with pins 8, projecting outwardly from their centers, which work in the elongated slots 9 of the actuating-levers 10. Said partitions are also provided, upon the ends of the sides opposite to those to which the gates are attached, with the retaining-cleats 11, for the purpose of receiving the removable gates 12, which when in place stop the flow of the solution through the subjacent perforations of the partitions. Said partitions are retained in place by vertical grooves at intervals in the sides of the precipitating-box, into which they may be inserted or withdrawn at pleasure. The lid or cover of the box C may be divided into sections, if desired, and are provided with elongated slots 13 at intervals corresponding with the actuating-levers 10, through which said levers project. Said precipitating-box is also provided with the discharging regulatory stop-cocks 14 and 15, one at the top of the end of the box and the other at the bottom. When the precipitating action is taking place, the upper stop-cock 14 is used; but when for any reason the whole of the solution should be withdrawn from the box or from the last of the series of chambers then the lower stop-cock 15 is used.

It will be readily seen that by the use of the gates under the control of the actuating-levers 10 the direction of the flow of the solution can be changed at will, and that by the use of the removable gate 12, in connection with the permanent gates, the flow of the solution through any particular perforations of the partitions may be stopped at will, and also that by the removal of the partitions any particular chamber can be united with any adjacent chamber, or by the removal of all the partitions the whole interior of the precipitating-box is exposed.

Having thus described our invention, what we claim, and desire to secure by Letters Patent, is—

1. In apparatus for the recovery of precious metals from their solutions the within described precipitating box adapted to contain a finely sub-divided, metallic, precipitating re-agent, divided into a series of compartments by removable perforated partitions, said partitions being provided with adjustable gates, controlling the flow of said solution through the perforations in said partitions for the purposes indicated substantially as described.

2. In apparatus for the recovery of precious metals from their solutions, the within described precipitating-box adapted to contain a finely sub-divided, metallic precipitating re-agent, the combination of the removable, perforated partitions, 4, with the adjustable gates 6, whereby the direction of the flow of the solution through the perforations 5, may be changed at will, as and for the purpose indicated, substantially as described.

3. In apparatus for the recovery of precious metals from their solutions, the within described precipitating box, adapted to contain a finely sub-divided, metallic precipitating re-agent, the removable, perforated partition 4, in combination with the removable gate, 12, whereby the flow of the solution through any of the perforations, 5, may be stopped as occasion may require, as and for the purposes indicated, substantially as described.

4. In apparatus for the recovery of precious metals from their solutions the within described precipitating box, B, with its removable cover C, adapted to contain a finely sub-divided metallic precipitating re-agent, the combination of the perforated partition, 4, the adjustable gates, 6, the actuating levers 10, the removable gates, 12, whereby the flow of the solution through the perforations 5, may be controlled or stopped at will, as and for the purposes indicated, substantially as described.

In testimony whereof we affix our signatures in presence of two witnesses.

THOMAS L. WISWALL.
JEROME B. FRANK.

Witnesses:
FREDERICK STEINHAM,
CLIFTON A. WISWALL.